United States Patent Office 3,267,119
Patented August 16, 1966

1

3,267,119
PROCESS FOR THE PRODUCTION OF 17α-HYDROXY STEROIDS OF THE ANDROSTANE AND ESTRANE SERIES
Francisco Alvarez, Palo Alto, Calif., assignor to Syntex Corporation, Panama, Panama, a corporation of Panama
No Drawing. Filed Sept. 2, 1964, Ser. No. 394,044
Claims priority, application Mexico, Sept. 13, 1963, 73,852
7 Claims. (Cl. 260—397.4)

The present invention relates to a new process for preparing certain cyclopentanoperhydrophenanthrene derivatives.

More particularly it relates to a process for preparing 17-epi-testosterone and 17α-estradiol from the corresponding 17β-acetylamino compounds.

The methods described so far in the literature for the obtention of these 17α-hydroxy steroids give very low yields; thus for example, by following the method of J. Elks et al., J. Chem. Soc., 241 (1953), whereby testosterone is transformed into its tosylate, followed by acetolysis and saponification, there are obtained yields of approximately 5%. There has also been obtained epitestosterone from 3-hydroxy-Δ$^{5,16}$-etiadienic acid as shown by F. Sondheimer et al., J. Am. Chem. Soc., 77, 4145 (1955). The compound 17α-estradiol has been obtained by reduction of estrone with Raney nickel in the presence of potassium hydroxide (B. Whitman et al., J. Biol Chem., 118, 789 (1937)).

In accordance with the present invention the surprising discovery has been made that by thermal decomposition of the 17β-N-nitroso-N-acetylamino compounds of the androstane and estrane series, there are obtained the corresponding 17α-acetoxy steroids in very good yields. The reaction involves inversion of configuration at C-17. The thermal decomposition is effected at a temperature comprised between 130 and 180° C., preferably by a prolonged reflux in an inert organic solvent such as for example using aromatic hydrocarbons having a boiling point between the above mentioned ranges. Examples of suitable solvents are: xylene, anisole, chlorobenzene, dichlorobenzene, aniline, benzylamine, diglyme, dimethylformamide, and the like.

Alternatively, this reaction may be carried out by heating the nitroso compound in an oil bath, at approximately 150° C. under high vacuo.

Upon conventional saponification of the 17α-acetoxy compounds thus obtained, preferably by reflux with a dilute solution of sodium hydroxide in methanol, there are obtained the 17α-hydroxy compounds.

The formation of the 17-epitestosterone is illustrated by the following sequence of reactions:

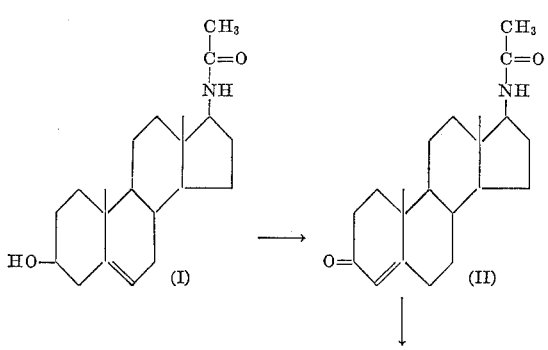

2

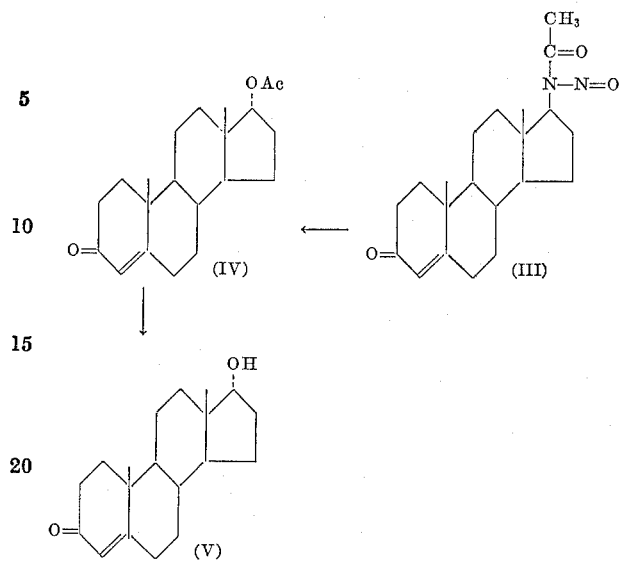

In practicing the process illustrated above, the starting material 17β-acetylamino-Δ$^5$-androsten-3β-ol (I) was oxidized by the Oppenauer method, preferably using aluminum isopropoxide in toluene solution and in the presence of cyclohexanone, to produce 17β-acetylamino-Δ$^4$-androsten-3-one (II). Upon nitrosation of this compound with nitrogen tetroxide in chloroform-carbon-tetrachloride mixture, at a temperature of approximately 0° C., there is obtained 17β-N-nitroso-N-acetylamino-Δ$^4$-androsten-3-one (III) which by thermal decomposition at a temperature comprised between 130–180° C. in an inert organic solvent, using preferably aromatic hydrocarbons or ethers whose boiling point is comprised within the indicated temperatures, for a period of time in the order of 24 to 48 hours, preferably for 36 hours, gives rise to the acetate of 17-epitestosterone (IV). Conventional saponification of this compound, preferably by reflux with a dilute solution of sodium hydroxide in methanol produces 17-epitestosterone (V).

In a similar manner, when the acetate of 17β-acetylamino-Δ$^{1,3,5(10)}$-estratriene-3-ol (obtained from the acetate of 3-hydroxy-17β-acetyl-Δ$^{1,3,5(10)}$-estratriene by formation of its oxime followed by Beckmann rearrangement) is treated with nitrogen tetroxide in mixture with chloroform-carbon tetrachloride, there is obtained the acetate of 17β - N - nitroso-N-acetylamino-Δ$^{1,3,5(10)}$-estratrien-3-ol, which by thermal decomposition followed by saponification of the acetoxy groups produces 17α-estradiol.

The following examples illustrate the invention but are not intended to limit its scope.

PREPARATION 1

To a solution of 5 g. of the acetate of 3-hydroxy-17β-acetyl-Δ$^{1,3,5(10)}$-estratriene in 100 cc. of ethanol, there was added 1.5 g. of hydroxylamine-hydrochloride and the mixture refluxed for 30 minutes. It was then cooled and the formed precipitate filtered off, washed with hot water and dried under vacuo, thus producing the oxime of the diacetate of Δ$^{1,3,5(10)}$-19-nor-pregnatrien-3-ol-20-one.

A stirred solution of 5 g. of the foregoing oxime in 25 cc. of anhydrous pyridine was cooled to 0° C. and slowly treated with a solution of 6 g. of p-acetamidobenzenesulfonyl chloride in 15 cc. of pyridine, maintaining the temperature between 0–5° C. The reaction mixture was stirred for 4 hours further at the same temperature, poured into ice water and extracted with ethyl acetate. The organic extract was washed with dilute hydrochloric acid, 10% sodium carbonate solution and finally with water to neutral, dried over anhydrous sodium sulfate and evaporated to dryness under vacuo. The residue was crystallized from acetone-hexane to produce the acetate of 17β-acetylamino-$\Delta^{1,3,5(10)}$-estratrien-3-ol.

Example I

A solution of 8 g. of 17β-acetylamino-$\Delta^5$-androsten-3β-ol in 80 cc. of toluene and 12 cc. of cyclohexanone was dried by distillation of 10 cc. of solvent. There was then added a solution of 1.6 g. of aluminum-isopropoxide dissolved in 10 cc. of anhydrous toluene and the mixture was heated at reflux temperature for 45 minutes; 4 cc. of acetic acid was added and the solvents eliminated by steam distillation. The product was extracted several times with ethyl acetate and the organic extracts washed with 5% hydrochloric acid solution, water, 10% sodium carbonate solution and water to neutral, dried over anhydrous sodium sulfate and evaporated to dryness. Crystallization from ethanol gave 17β-acetylamino-$\Delta^4$-androstene-3-one; M.P. 272–273° C.;

$\lambda_{max.}^{EtOH}$ 241–242 mμ, ε 15,500

Example II

To a solution of 2.8 g. of 17β-acetylamino-$\Delta^4$-androsten-3-one in 42 cc. of chloroform distilled over calcium chloride, there was added 4 cc. of anhydrous sodium acetate and to the mixture cooled to 0° C. there was slowly added a cooled solution of 3.8 g. of nitrogen tetroxide in 42 cc. of carbon tetrachloride. The reaction mixture was then kept at room temperature for 45 minutes, poured into ice water and extracted with chloroform. The organic extract was washed with water to neutral, dried over anhydrous sodium sulfate and evaporated to dryness under reduced pressure, thus obtaining the crude 17β-N-nitroso N-acetylamino-$\Delta^4$-androsten-3-one, which was used for the next step without further purification.

A solution of 2.5 g. of the foregoing crude product in 165 cc. of xylene was refluxed under anhydrous conditions for 36 hours. The solvent was eliminated by distillation under vacuo and the oily residue (acetate of 17-epitestosterone) was dissolved in a previously prepared solution of 1 g. of sodium hydroxide in 50 cc. of 90% methanol. The reaction mixture was refluxed for 3 hours, neutralized with acetic acid and diluted with water. The product was extracted with methylene chloride and the organic extract washed with water, dried over anhydrous sodium sulfate and evaporated to dryness. The residue was chromatographed on 100 g. of acid alumina. The fractions eluted with methylene chloride were crystallized from acetone, thus yielding the pure epitestosterone, M.P. 211–215° C.;

$\lambda_{max.}^{EtOH}$ 240 mμ, ε 15,500 identical to an authentic sample.

Example III

A solution of 2 g. of 17β-N-nitroso-N-acetylamino-$\Delta^4$-androsten-3-one in 100 cc. of anisole was heated at reflux temperature for 40 hours. The solvent was eliminated by steam distillation and the product extracted with methylene chloride; the organic extract was washed with water to neutral, dried and evaporated to dryness under vacuo. The residue was dissolved in 50 cc. of methanol, 1 g. of sodium hydroxide dissolved in 5 cc. of water was added and the mixture refluxed for 1 hour, poured into water, extracted with methylene chloride and washed to neutral, dried and evaporated to dryness. Chromatography of the residue on acid alumina gave epi-testosterone identical to the obtained in the preceding example.

Example IV

Example II was repeated but using the acetate of 17β-acetylamino-$\Delta^{1,3,5(10)}$-estratrien-3-ol as starting material, thus producing successively the acetate of 17β-N-nitroso-N-acetylamino-$\Delta^{1,3,5(10)}$-estratrien-3-ol, the diacetate of 17α-estradiol and 17α-estradiol, identical to an authentic sample.

Example V

Example III was repeated but using chlorobenzene instead of anisole to produce also epi-testosterone in similar yield.

Example VI

A solution of 1 g. of the acetate of 17β-N-nitroso-N-acetylamino-$\Delta^{1,3,5,(10)}$-estratrien-3-ol in 25 cc. of diglyme was refluxed for 30 hours, cooled, diluted with water and extracted with ethyl acetate, the organic extract was washed several times with water, dried and evaporated to dryness. The oily residue was treated with a dilute solution of sodium hydroxide in methanol, in accordance with the method of Example II, to produce 17α-estradiol, identical to the obtained in Example IV.

I claim:

1. In the process for preparing 17α-hydroxy steroids selected from the group consisting of the androstane and estrane series, the steps comprising treatment of the corresponding 17β-acetylamino compound with nitrogen tetroxide, followed by thermal decomposition of the thus obtained 17β-N-nitroso-N-acetylamino compound.

2. The process of claim 1 wherein the thermal decomposition is effected by reflux in a solvent having a boiling point of between 130 and 180° C. for a period of time of between 24 and 48 hours.

3. The process of claim 2 wherein the solvent used is xylene.

4. The process of claim 2 wherein the solvent used is anisole.

5. The process of claim 2 wherein the solvent used is diglyme.

6. The process of claim 1 wherein the starting material is 17β-acetylamino-$\Delta^4$-androsten-3-one and the product obtained is 17-epitestosterone.

7. The process of claim 1 wherein the starting material is the acetate of 17β-acetylamino-$\Delta^{1,3,5(10)}$-estratrien-3-ol and the product obtained is 17α-estradiol.

No references cited.

LEWIS GOTTS, *Primary Examiner.*

ELBERT L. ROBERTS, *Assistant Examiner.*